(12) United States Patent
Odino et al.

(10) Patent No.: US 11,141,940 B2
(45) Date of Patent: Oct. 12, 2021

(54) COMPOSITE MATERIAL SHEET AND PROCESS FOR MANUFACTURING THE SAME

(71) Applicant: RENOLIT GOR S.P.A., Buriasco (IT)

(72) Inventors: Adriano Odino, Angrona (IT); Andrea Strignano, Turin (IT); Raffaella Giovannini, Piscina (IT)

(*) Notice: Subject to any disclaimer, the term of this patent is extended or adjusted under 35 U.S.C. 154(b) by 478 days.

(21) Appl. No.: 16/066,136

(22) PCT Filed: Feb. 3, 2017

(86) PCT No.: PCT/IB2017/050599
§ 371 (c)(1),
(2) Date: Jun. 26, 2018

(87) PCT Pub. No.: WO2017/134619
PCT Pub. Date: Aug. 10, 2017

(65) Prior Publication Data
US 2020/0282619 A1    Sep. 10, 2020

(30) Foreign Application Priority Data
Feb. 5, 2016   (IT) .................... 102016000012078

(51) Int. Cl.
*B29D 7/00* (2006.01)
*B29C 48/07* (2019.01)
(Continued)

(52) U.S. Cl.
CPC ................. *B29D 7/00* (2013.01); *B29B 7/90* (2013.01); *B29C 48/022* (2019.02); *B29C 48/07* (2019.02);
(Continued)

(58) Field of Classification Search
CPC .. B29B 9/14; B29B 7/90; B29C 70/14; B29K 2023/06; B29K 2023/12; B29K 2023/00;
(Continued)

(56) References Cited

U.S. PATENT DOCUMENTS

| 4,938,905 A | 7/1990 | Daimaru |
| 5,185,117 A | 2/1993 | Hawley |

(Continued)

FOREIGN PATENT DOCUMENTS

| EP | 0643093 | 3/1995 |
| EP | 0847845 | 6/1998 |

(Continued)

OTHER PUBLICATIONS

S. Fliegener et al., Microstructure-based modeling of the creep behavior of long-fiber-reinforced thermoplastics, ECCM, vol. 15, Jun. 28, 2012, Venice, Italy Fig. 4.
(Continued)

*Primary Examiner* — Camie S Thompson
(74) *Attorney, Agent, or Firm* — Themis Law

(57) ABSTRACT

A composite material sheet or panel is obtained by extruding a mixture composed of at least one thermoplastic material, particularly of the polyolefin family, and of mineral fibers having predetermined dimensional characteristics (diameter and length). The extrusion process is performed with parameters sufficient to generate in the sheet a three-dimensional structure embedded in the thermoplastic material.

11 Claims, 3 Drawing Sheets

(51) Int. Cl.
  *B29C 48/40* (2019.01)
  *B29C 48/00* (2019.01)
  *B29C 48/08* (2019.01)
  *B29B 7/90* (2006.01)
  *B32B 5/12* (2006.01)
  *B32B 5/28* (2006.01)
  *B29C 48/285* (2019.01)
  *B29K 101/12* (2006.01)
  *B29K 105/12* (2006.01)
  *B29K 309/08* (2006.01)
  *B29L 7/00* (2006.01)

(52) U.S. Cl.
  CPC .............. *B29C 48/08* (2019.02); *B29C 48/40* (2019.02); *B32B 5/12* (2013.01); *B32B 5/28* (2013.01); *B29C 48/2886* (2019.02); *B29C 48/402* (2019.02); *B29K 2101/12* (2013.01); *B29K 2105/12* (2013.01); *B29K 2309/08* (2013.01); *B29L 2007/002* (2013.01)

(58) Field of Classification Search
  CPC ............ B29K 2101/12; B29K 2309/08; B29K 2105/16; B29K 2105/06; B29K 2223/00; C08L 23/12; B32B 5/12; B32B 5/18; B29L 2007/02; C08K 7/14; C08J 2323/04; C08J 2323/10; C08J 5/043
  USPC ............ 428/221, 297.4, 299.4, 299.1, 298.1; 264/108, 45.9, 177.2; 156/244.11
  See application file for complete search history.

(56) References Cited

U.S. PATENT DOCUMENTS 5,273,819 A * 12/1993 Jex .......................... B29C 70/14
    428/299.1
2006/0103045 A1   5/2006 O'Brien-Bernini
2013/0072626 A1*  3/2013 Chen ....................... B29C 55/00
    524/584

FOREIGN PATENT DOCUMENTS

WO      0211971      2/2002
WO      2011156128   12/2011

OTHER PUBLICATIONS

Mikell Knights, Long-fiber thermoplastics extend their reach, www.ptonline.com/articles/long-fiber-thermoplastics-extend-their-reach.
Balaji Thattaiparthasarathy K et al., Process simulation, design and manufacturing of a long fiber thermoplastic composite for mass transit application, Composites Part A: Applied Science and Manufacturing, Elesevier, Amsterdam, NL, vol. 39, No. 9, Sep. 1, 2008, pp. 1521-1521 Fig. 3.

* cited by examiner

COMPOSITE MATERIAL SHEET AND PROCESS FOR MANUFACTURING THE SAME

The invention relates to a composite material sheet and process for manufacturing the same.

The term "composite" means a material obtained by combining two or more components, called also as phases, combined according to various proportions and shapes, such that the final product has a non-homogeneous structure and has chemical-physical properties different from those of the individual constituents. One of the phases, called as matrix, has a continuous form and it mainly acts for maintaining the cohesion of the reinforcement phase or phases, for guaranteeing a certain shape of the piece, as well as for protecting and uniformly transmitting the load to the other reinforcement phase. This latter on the contrary is composed of a discontinuous constituent, generally made of fibers or particles whose task is to guarantee mechanical strength and stiffness, most of the external load being borne by it.

In particulate composites the reinforcement is composed of "particles", which (unlike fibers) can be considered equiaxial, namely the diameter to length ratio of each particle is equal about to one (while the fibers are more developed in length direction).

The composite materials with the dispersed phase made of fibers exhibit a strong anisotropy. Such anisotropy is not found (or at least it is very lower) in particulate composites, provided that said particles are equiaxial.

The basic idea of the composites is to optimize the performances of the so called traditional materials, as regards the chemical-physical, mechanical and lightweight properties.

By combining a material having a given property (for example a polymer) with another one having different properties (for example carbon fibers), it is possible to obtain a material, composed of such two materials, that enhances the best properties thereof. The composite materials are particularly interesting since they offer particular combinations of different properties that cannot be contemporaneously present in conventional materials such as metal alloys, ceramics and polymers.

In the automotive industry, it is known to use panels made of composite material for manufacturing internal parts of motor vehicles such as headliners, load spaces, rear shelves etc.

Said panels have to exhibit a considerable mechanical strength in combination with a good flexibility level and a weight as low as possible.

The panels made of thermoplastic material filled with vegetable fillers are a good compromise due to their mouldability, for example by thermoforming, their good mechanical strength, their good fracture behavior, in combination with low manufacturing costs. Moreover vegetable fillers allow very light panels to be produced with obvious advantages as regards handling and fuel consumption for the vehicles bearing them.

The document EP2247653 describes a composite material sheet having a polypropylene matrix and a filler composed of vegetable fibers, in particular cellulose.

An alternative to vegetable fibers is the use of mineral or inorganic fibers, particularly glass fibers. Such type of fibers is more resistant, more rigid, have a high melting point and are completely flame-resistant. On the contrary, except for metal fibers, they are very brittle.

In particular glass fibers have a high bending and impact strength and a low thermal and electrical conductivity together with a relatively low density, which make them particularly useful for being used in the automotive industry.

On the other side, if they are not well embedded in the matrix of the composite, which guarantees the mouldability thereof, they can be spread in the environment and be dangerous for the health, unlike vegetable fibers.

The aim of the present invention is to provide a composite material sheet or plate with a polymer matrix and a filler of inorganic fibers, particularly glass fibers, wherein the matrix is able to perfectly embed the filler, firmly incorporating it therein, thus avoiding the presence of surface fibers that can detach therefrom and be dispersed in the environment, particularly in a vehicle compartment.

The invention achieves the aim by providing a composite material sheet having the characteristic of being obtained by extrusion of a mixture composed of a thermoplastic material, particularly of polyolefin family, such as for example polyethylene, polypropylene, mixtures of polyolefins or the like and of groups of non-vegetable fibers, typically glass fibers, having a predetermined length and wherein the extrusion is performed with such parameters to generate a three-dimensional fiber structure called as fiber "mat", where the fibers are entangled on themselves.

In particular, such mat is composed of the combination of fibers mainly arranged in the extrusion direction, but, at the same time, exhibiting a kind of isotropy in the other two directions of the plane, due to the mechanical action exerted by the extruder opening and aligning the individual fiber bundles.

The invention is based on a unexpected technical effect. As it is known, it is possible to produce composite sheets by impregnating a preformed layer of glass fibers with a polymer matrix, for example polypropylene. The fibers that compose the layer, oriented or not according to a main direction, woven or non-woven, can be dampened by the matrix by coating and compression with a calender or by using softening techniques with cycles at different temperatures. The inventors have found that it is possible to obtain three-dimensional fiber structures completely covered by a polymer matrix by an extrusion process while keeping the dimensions of the fibers under control.

In particular, the invention relates to the use of fibers, with a diameter ranging from 5 to 50 micron and a length ranging from 1 to 20 mm.

In particular, the invention relates to the use of fibers with the characteristics described at the previous point grouped together in bundles of fibers, that are disgregated into individual units and oriented by forming a three-dimensional structure by the mechanical action exerted firstly by the mixer, then by the screw or screws of the extruder and then by the output die of the extruder.

The maximum effect occurs when the groups of fibers have the shape of cylinders having a thickness ranging from 0.5 to 2 mm, preferably about 1 mm, and a length ranging from 2 to 20 mm, preferably in the order of 2-3 mm. Such effect is well clear if a calcination of the composite material is performed by using a muffle furnace. The inorganic component composing the so called mat in the composite material, remains unchanged while organic matter, by being calcinated, is removed from the system. Therefore, it is possible to analyse the amount and the arrangement of the inorganic filler that was embedded in the polymer matrix.

The mechanical action exerted by the extrusion on an heterogeneous mixture composed of granules or powder of a thermoplastic polymer and agglomerates of glass fibers is able to break the fiber groups and to disperse the filaments in the polymer matrix.

Specifically, the process for producing a composite material sheet according to the invention provides to mix the thermoplastic material in the form of granules or powder with groups of fibers having a predetermined length and to form the sheet by extruding the mixture through an extrusion die. Mixing and extrusion are performed with such parameters to generate a three-dimensional fiber structure called as mat, embedded in the thermoplastic material. It is the mixing step that causes the fiber bundles to be disgregated without considerably changing the dimensional characteristics thereof. In the extrusion step the individual fibers are arranged to form the mat, in turn completely impregnated by the thermoplastic material.

It has to be noted how the sheets according to the invention are completely recyclable. To this end, according to one embodiment, the process provides the step of preliminarily grinding the recycle composite sheets to obtain the thermoplastic material and the fibers to be mixed. In this case a further step is provided such to add in the mixture an amount of the material obtained by grinding the side trims and waste pieces in general (provided that they are consistent with each other as regards the formulation).

If one considers that the thermoplastic material and the fibers are typically present in the sheet substantially under the same proportion, that is 50 and 50 by weight, by feeding the mixer with recycle material and with polymer material in the same amount, the final extrusion will be able to maintain the same proportion of the components if the same amount of fibers is added in a step following the mixing step.

The mixing and extrusion steps advantageously are performed in an extruder, particularly a twin-screw extruder, with an output flat die. The fibers entangle with each other due to the mechanical action exerted by the mixing screws and the extrusion die thus generating a fiber entanglement contemporaneously to the mixing/extrusion step.

The plates or sheets according to the invention are particularly useful for being used in the automotive industry. For example, they can be used for forming rear shelves, load spaces, headliners for motor vehicles, bodywork parts, truck cabs, spoilers, control boards, tool-holding panels, housings for lights and the like.

However also other applications are possible, particularly in those fields requiring small encumbrances and contemporaneously high levels of mechanical strength especially in low cost products and lightweight products.

Examples of the present invention are described hereinafter by means of the following figures in which.

In the following some examples will be described with the help of the annexed drawings.

An extruded sheet comprising a blend of poliolefine resins and of glass fibres according to the present invention has been extruded. The sheet thickness is of 2.2 mm.

The length of the die in the direction of extrusion has been varied in four steps between 40 and 100 mm.

The temperature of the material being extruded is between 200 and 220° degrees C.

Figure 1:
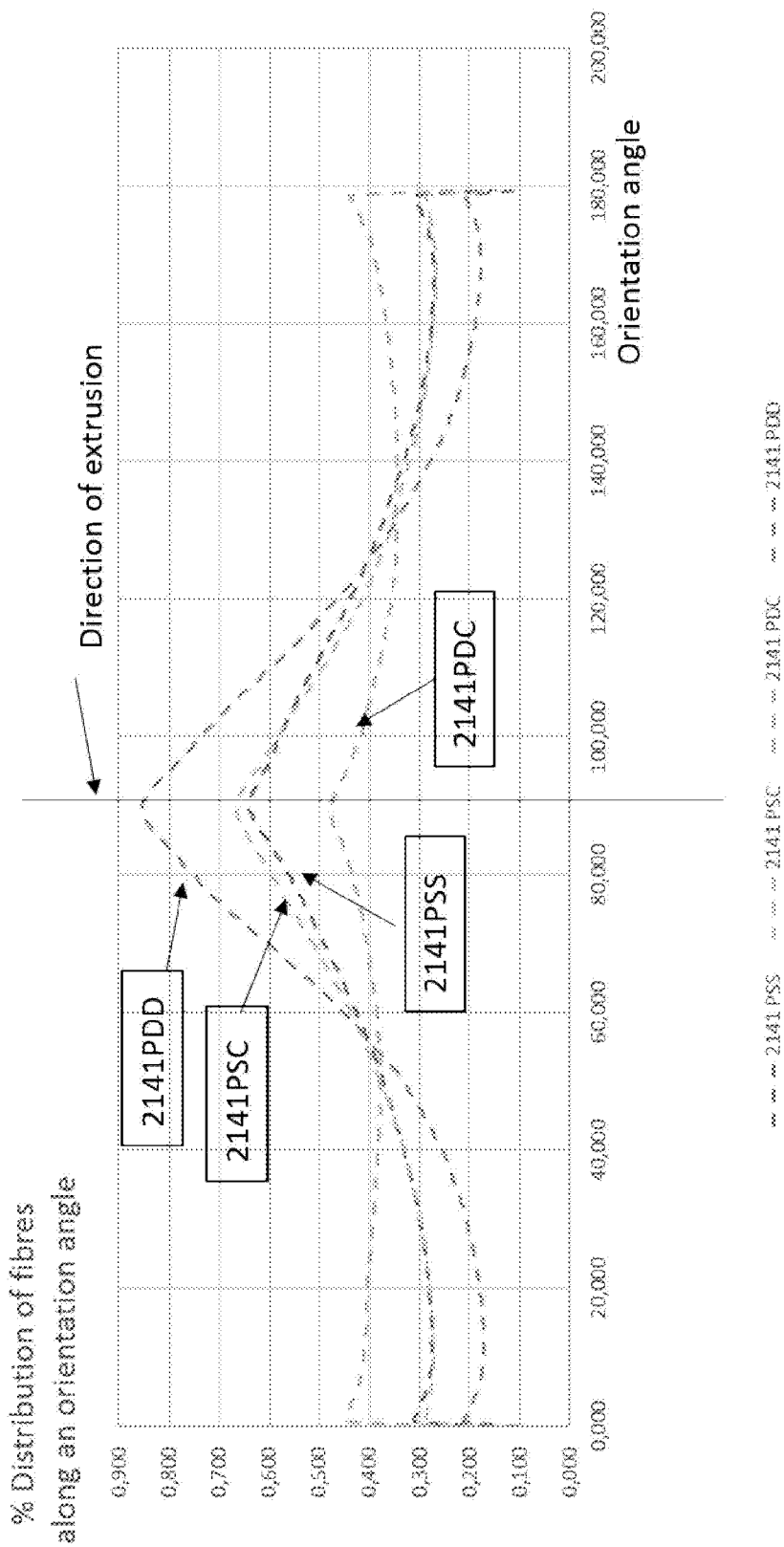
FIG. 1 illustrates a graphic representation of the percentage of the distribution of the orientation of the fibers in relation to the extrusion direction which corresponds to an angle of 90° and for different settings of the temperature and of the length of the extrusion die of platform in a direction of extrusion.

FIG. 1 shows the curves of distribution of the fibres relatively to their orientation in respect to the direction of extrusion and expressed in percent.

The measurement of the data has been carried out by evaluating the fibres oriented along a certain angle with respect to the direction of extrusion which coincides with a 90° angle in FIG. 1.

Maximum angle of orientation of the fibres is 0° and 180° which corresponds to an orientation of the fibres perpendicular to the direction of extrusion and in the two directions starting from the direction of extrusion.

Measurement has been carried out by means of an RX tomography which has been angularly displaced each time of 0.5° relatively to a centre of rotation falling on an axis oriented in the direction of extrusion.

At each angle of acquisition, the corresponding percentage of fibres oriented along the said angle has been determined.

The curves have been rescaled in order that their integral from 0° to 180° corresponds to the 100% of the fibres comprised in the sheet.

The different curves relate to different length of the extrusion die starting from 30 cm up to 100 cm.

The four curves are identified by symbols and by a name 2141PDC, 2141PSS, 2141PSC, 2141PDD.

As it appears form the curves by varying the length of the die, the distribution of the fibres becomes more and more non isotropic. The curve defined as 2141PDC is the flattest one. This means that the fibres are isotropically oriented in relation to the direction of extrusion.

This has an effect on the ratio of flexural modulus values in longitudinal and in transverse direction as referred to the direction of extrusion and where this direction is parallel to the longitudinal direction.

The ratio of the distributions at the maximum of the curve to the minimum of the curve relating to the example 2141PDC is about 1.2.

By varying the length of the die a higher number of fibres are aligned in the direction parallel to the direction of extrusion. The curve relating to the example 2141PDD shows the higher dynamic in range and indicates a ratio of the distributions at the maximum of the curve to the minimum of the curve of about 5.7:1.

This means that in this case a higher percentage of the fibers are oriented in a direction parallel to the direction of extrusion than the ones oriented transversally to it. In this case the ratio between longitudinal and transversal flexural modulus as defined above is different and the higher so that the sheet has a higher resistance against flexural stresses in the longitudinal direction.

Figure 2:
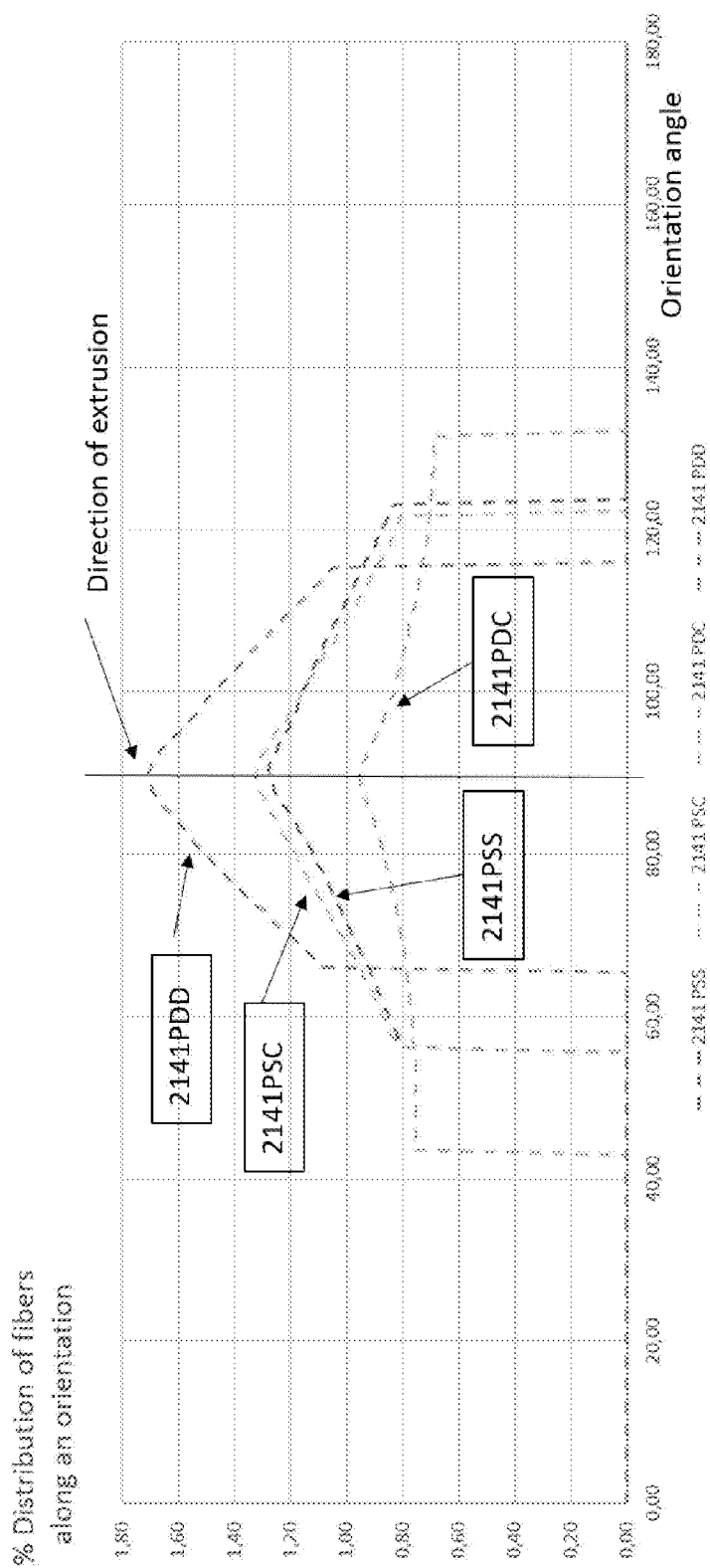
FIG. 2 illustrate a similar graph as in FIG. 1 but the measurement is limited to a layer of about 0.5 mm depth along each of the two opposite surfaced of the sheet.

FIG. 2 shows what happens to the distribution of the orientation of the fibres in respect to the direction to extrusion in a thin superficial layer of about 0.5 mm depth from a surface of the sheet.

Again the measurements are taken in relation to the direction of extrusion corresponding to the 90° angle in the graph and using the same RX tomography as for FIG. 1.

Four sheets obtained with four die length has been scanned as explained above. The form sheets and the relative curves are identified as already done above.

In reading the curves it appears that varying the die length has the effect not only of flattening the curve, meaning having a higher degree of isotropy or unisotropy of the fibres orientation distribution, but it varies also the angular width of the possible orientation of the fibres centered along the direction of extrusion (90°). Curve 2141PDC is more flattened and most fibres will be distributed in a isotropic way along directions comprised between about −50° and +50° relatively to the direction of extrusion (90°). Curve 2141PDD shows a more unisotropic distribution of the fibres on the different orientations but the angular width of the possible orientations is reducing to about −30° to +30° relatively to the direction of extrusion. Examples 2141 Psc and Pss show an intermediate behavior between 2141PDC and 2141PDD.

Although the above examples are limited to a variation in the length of the dye, experiments has shown also a similar influence on the distribution of the fibres on different angular orientations in respect to the direction of extrusion determined by varying the temperature of the mixture being extrused.

Figure 3:
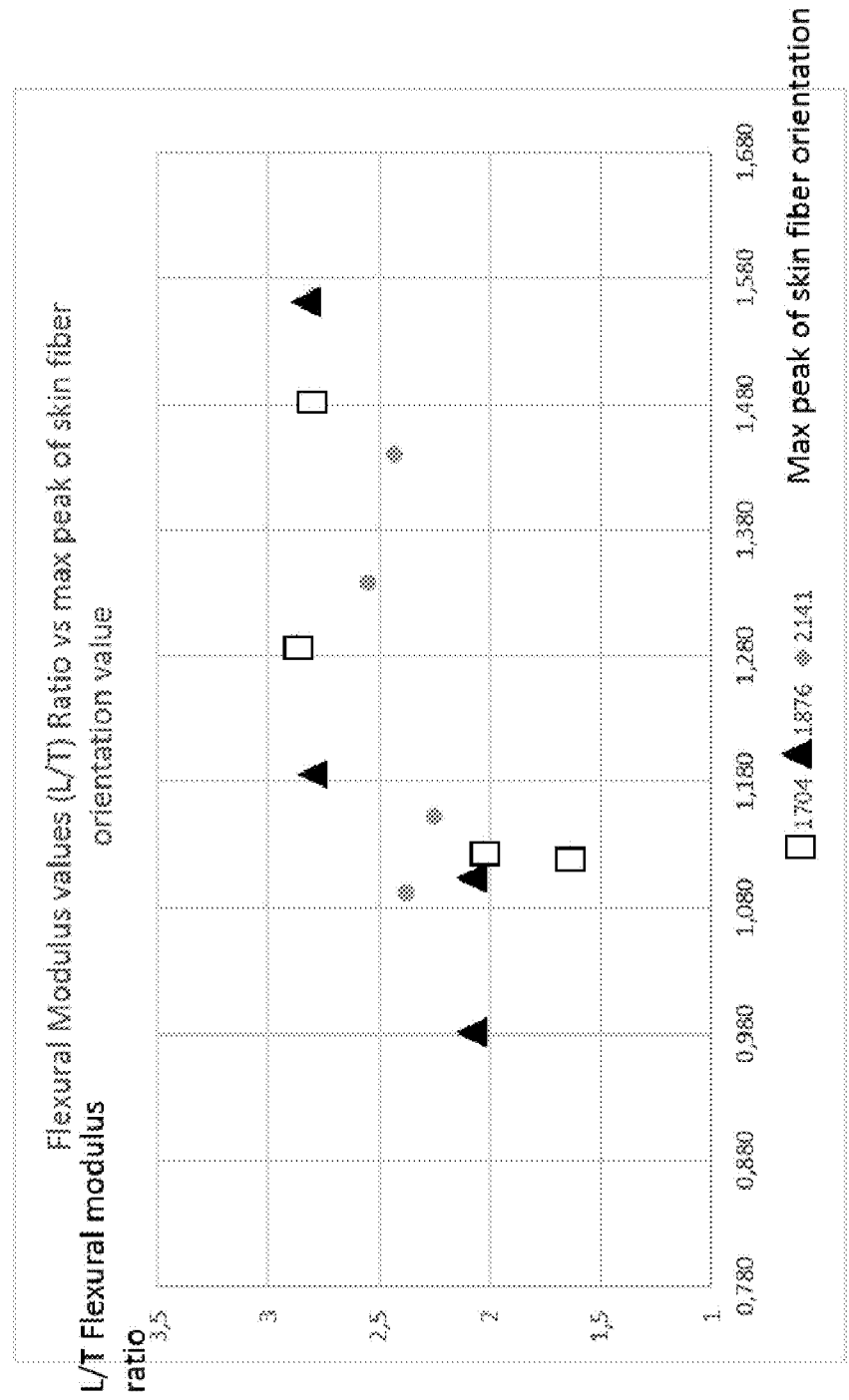
FIG. 3, is a graph putting in relation the ratio of the flexural modulus along the direction of extrusion and perpendicular to the direction of extrusion of the sheets according to the examples of the FIGS. 1 and 2 with the peak values of the graphs of FIGS. 1 and 2.

FIG. 3 shows the ratio of the longitudinal flexural modulus to the transverse flexural modulus on sheets according to the present invention showing different distributions of the fibres along different orientations with respect of the direction of extrusion.

As already indicated above the term longitudinal direction means here parallel to the direction of extrusion, while the term transverse direction means a direction perpendicular to the direction of extrusion.

Two further examples have been added to the one indicated by 2141 and discussed in relation to the four cases of FIGS. 1 and 2.

As it appears from the above description, the invention allows to optimize the mechanical properties of the sheet in relation to two different directions (longitudinal and transverse) parallel and perpendicular to the direction of extrusion of the sheet. This is achieved without the need of modifying the composition of the sheet material or the thickness of the sheet but only setting different distribution of the fibers onto different orientations in relation to the direction of extrusion by varying only some parameters of the extrusion process and particularly length of the extrusion die and/or temperature of the mass of material to be extruded.

The invention claimed is:

1. An extruded composite material sheet or panel comprising:
    a thermoplastic material; and
    non-vegetable fibers embedded in the thermoplastic material and having a predetermined length and forming a three-dimensional fiber structure,
    wherein the fibers are entangled on themselves, the fibers of the three dimensional fiber structure showing a distribution percentage of an orientation of the fibers relative to a direction of extrusion which is between a ratio of 1:1 to a ratio of 6:1 between a percentage of the fibers oriented in the direction of extrusion and the ratio of the fibers directed in a direction perpendicular to the direction of extrusion,
    wherein the sheet has a length, a width, and a thickness,
    wherein the distribution percentage of the orientation of the fibers relative to the direction of extrusion varies along the thickness of the sheet.

2. The extruded composite material sheet according to claim 1,
    wherein about half a number of the fibers, within a layer of the sheet forming surfaces of the sheet at two opposed faces, has an orientation between a direction +60° and −60° relative to the direction of extrusion, and
    wherein a ratio of the distribution percentage of the orientation of the fibers relative to the direction of extrusion, between the orientation of the fibers along the directions at +60° or −60 relative to the direction of extrusion and an orientation of the fibers parallel to the direction of extrusion being between a ratio of 1:1 and a ratio of 6:1.

3. The extruded composite material sheet according to claim 1, wherein said three-dimensional fiber structure comprises a combination of the fibers mainly arranged in the direction of extrusion, and for a part, at a same time, exhibiting isotropy in two other directions of a plane, due to a mechanical action exerted by an extrusion opening and an aligning individual fiber bundles.

4. The extruded composite material sheet according to claim 1, wherein the thermoplastic material belongs to the group consisting of polyethylene, polypropylene, or mixtures of polyolefins.

5. The extruded composite material sheet according to claim 1, wherein the non-vegetable fibers comprise glass fibers.

6. The extruded composite material sheet according to claim 1, wherein the thermoplastic material and the fibers are present substantially in a same proportion.

7. A composite panel comprising:
    an extruded composite material sheet comprising:
    a thermoplastic material; and
    non-vegetable fibers embedded in the thermoplastic material and having a predetermined length and forming a three-dimensional fiber structure,
    wherein the fibers are entangled on themselves, the fibers of the three dimensional fiber structure showing a distribution percentage of an orientation of the fibers relative to a direction of extrusion which is between a ratio of 1:1 to a ratio of 6:1 between a percentage of the fibers oriented in the direction of extrusion and the ratio of the fibers directed in a direction perpendicular to the direction of extrusion,
    wherein the sheet has a length, a width, and a thickness,
    wherein the distribution percentage of the orientation of the fibers relative to the direction of extrusion varies along the thickness of the sheet,
    wherein about half a number of the fibers, within a layer of the sheet forming surfaces of the sheet at two opposed faces, has an orientation between a direction +60° and −60° relative to the direction of extrusion, and
    wherein a ratio of the distribution percentage of the orientation of the fibers relative to the direction of extrusion, between the orientation of the fibers along the directions at +60° or −60 relative to the direction of extrusion and an orientation of the fibers parallel to the direction of extrusion being between a ratio of 1:1 and a ratio of 6:1.

8. The extruded composite material sheet according to claim 7, wherein said three-dimensional fiber structure comprises a combination of the fibers mainly arranged in the direction of extrusion, and for a part, at a same time, exhibiting isotropy in two other directions of a plane, due to a mechanical action exerted by an extrusion opening and an aligning individual fiber bundles.

9. The extruded composite material sheet according to claim 7, wherein the thermoplastic material belongs to the group consisting of polyethylene, polypropylene, or mixtures of polyolefins.

10. The extruded composite material sheet according to claim 7, wherein the non-vegetable fibers comprise glass fibers.

11. An extruded composite material sheet or panel comprising:
a thermoplastic material; and
non-vegetable fibers embedded in the thermoplastic material and having a predetermined length and forming a three-dimensional fiber structure,
wherein the fibers are entangled on themselves, the fibers of the three dimensional fiber structure showing a distribution percentage of an orientation of the fibers relative to a direction of extrusion which is between a ratio of 1:1 to a ratio of 6:1 between a percentage of the fibers oriented in the direction of extrusion and the ratio of the fibers directed in a direction perpendicular to the direction of extrusion,
wherein said three-dimensional fiber structure comprises a combination of the fibers mainly arranged in the direction of extrusion, and for a part, at a same time, exhibiting isotropy in two other directions of a plane, due to a mechanical action exerted by an extrusion opening and an aligning individual fiber bundles.

* * * * *